(12) United States Patent
Okamura et al.

(10) Patent No.: US 8,958,929 B2
(45) Date of Patent: Feb. 17, 2015

(54) VEHICLE CONTROL APPARATUS

(75) Inventors: Ryuji Okamura, Toyota (JP); Yuka Sobue, Toyota (JP); Yu Hiei, Toyota (JP); Chika Morimoto, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/982,529

(22) PCT Filed: Jan. 31, 2011

(86) PCT No.: PCT/JP2011/051924
§ 371 (c)(1),
(2), (4) Date: Jul. 30, 2013

(87) PCT Pub. No.: WO2012/104964
PCT Pub. Date: Aug. 9, 2012

(65) Prior Publication Data
US 2013/0311004 A1 Nov. 21, 2013

(51) Int. Cl.
*G05D 1/00* (2006.01)
*B60T 7/12* (2006.01)
*G08C 17/02* (2006.01)
*G08C 23/04* (2006.01)

(52) U.S. Cl.
CPC ............... *B60T 7/12* (2013.01); *G05D 1/0033* (2013.01); *G08C 17/02* (2013.01); *G08C 23/04* (2013.01); *G05D 2201/0213* (2013.01)
USPC ........................................... 701/2; 340/932.2

(58) Field of Classification Search
None
See application file for complete search history.

(56) References Cited

U.S. PATENT DOCUMENTS

| 3,819,932 | A  | * | 6/1974  | Auer et al. ..................... 246/1 R |
| 4,093,161 | A  | * | 6/1978  | Auer, Jr. ............................. 246/5 |
| 4,931,930 | A  | * | 6/1990  | Shyu et al. ...................... 701/36 |
| 7,054,729 | B2 | * | 5/2006  | Maier et al. ..................... 701/36 |
| 7,117,073 | B2 | * | 10/2006 | Endo et al. ...................... 701/28 |
| 7,263,420 | B2 | * | 8/2007  | Tanaka et al. ................... 701/36 |
| 7,366,595 | B1 | * | 4/2008  | Shimizu et al. ............... 701/301 |
| 7,369,940 | B2 | * | 5/2008  | Frank et al. ................... 701/300 |
| 7,375,651 | B2 | * | 5/2008  | Shimazaki et al. ......... 340/932.2 |
| 7,486,203 | B2 | * | 2/2009  | Tanaka et al. .............. 340/932.2 |
| 8,134,479 | B2 | * | 3/2012  | Suhr et al. .................. 340/932.2 |
| 8,229,607 | B2 | * | 7/2012  | Hrdlicka et al. ................ 701/20 |
| 8,279,087 | B2 | * | 10/2012 | Knoll et al. ................ 340/932.2 |

(Continued)

FOREIGN PATENT DOCUMENTS

| CN | 1976833   | 6/2007 |
| JP | 10-093219 | 3/1988 |

(Continued)

*Primary Examiner* — Jonathan M Dager
(74) *Attorney, Agent, or Firm* — Finnegan, Henderson, Farabow, Garrett & Dunner, LLP (57) ABSTRACT

In a vehicle control apparatus which performs a remote operation of a vehicle using a remote control, a remote operation of the vehicle which is not intended by a driver is prevented. When traveling control of a vehicle is performed through a remote operation from a remote control 3, a stop position of a vehicle 2 is set by a stop position setting device 9, and a movement course of the vehicle 2 is calculated by the vehicle course calculation device 10. In addition, the vehicle 2 is moved along the calculated movement course in response to a driving operation from the remote control 3, but if a driving operation from inside of the vehicle and a driving operation from the remote control 3 come into conflict, the driving operation from the remote control 3 is canceled, and the driving operation from inside of the vehicle is prioritized.

3 Claims, 7 Drawing Sheets

(56) References Cited

U.S. PATENT DOCUMENTS

| | | | |
|---|---|---|---|
| 8,417,415 B2* | 4/2013 | Phelan | 180/287 |
| 8,531,313 B2* | 9/2013 | Bammert et al. | 340/932.2 |
| 8,542,128 B2* | 9/2013 | Kawabata et al. | 340/932.2 |
| 8,630,757 B2* | 1/2014 | Daum et al. | 701/19 |
| 8,717,438 B2* | 5/2014 | Hosoi et al. | 348/148 |
| 2001/0027363 A1* | 10/2001 | Shimazaki et al. | 701/41 |
| 2002/0005779 A1* | 1/2002 | Ishii et al. | 340/436 |
| 2002/0041239 A1* | 4/2002 | Shimizu et al. | 340/932.2 |
| 2003/0156045 A1* | 8/2003 | Tanaka et al. | 340/932.2 |
| 2003/0222793 A1* | 12/2003 | Tanaka et al. | 340/932.2 |
| 2004/0119610 A1* | 6/2004 | Maemura et al. | 340/932.2 |
| 2004/0120305 A1* | 6/2004 | Aiken et al. | 370/347 |
| 2004/0129840 A1* | 7/2004 | Horst | 246/186 |
| 2004/0130464 A1* | 7/2004 | Schindler et al. | 340/932.2 |
| 2004/0139238 A1* | 7/2004 | Luhrs | 710/1 |
| 2004/0245410 A1* | 12/2004 | Kisak et al. | 246/3 |
| 2005/0049767 A1* | 3/2005 | Endo et al. | 701/36 |
| 2005/0234757 A1* | 10/2005 | Matheson et al. | 705/8 |
| 2007/0057816 A1* | 3/2007 | Sakakibara et al. | 340/932.2 |
| 2008/0048844 A1* | 2/2008 | Watanabe et al. | 340/425.5 |
| 2008/0245598 A1* | 10/2008 | Gratz et al. | 180/287 |
| 2008/0266051 A1* | 10/2008 | Taki et al. | 340/5.1 |
| 2009/0045912 A1* | 2/2009 | Sakamoto et al. | 340/5.64 |
| 2010/0070139 A1* | 3/2010 | Ohshima et al. | 701/42 |
| 2010/0152972 A1* | 6/2010 | Attard et al. | 701/42 |
| 2010/0155165 A1* | 6/2010 | Tseng et al. | 180/200 |
| 2012/0078443 A1* | 3/2012 | Matsubara | 701/2 |
| 2012/0226413 A1* | 9/2012 | Chen et al. | 701/36 |
| 2012/0316704 A1* | 12/2012 | Ohbayashi et al. | 701/2 |
| 2013/0080041 A1* | 3/2013 | Kumabe | 701/117 |
| 2014/0142805 A1* | 5/2014 | Frye | 701/36 |
| 2014/0143839 A1* | 5/2014 | Ricci | 726/4 |

FOREIGN PATENT DOCUMENTS

| | | |
|---|---|---|
| JP | 63-301172 | 12/1988 |
| JP | 2005-229831 | 9/2005 |
| JP | 2006-92130 | 4/2006 |
| JP | 2006-193919 | 7/2006 |
| JP | 2006-347334 | 12/2006 |
| JP | 2008-33438 | 2/2008 |
| JP | 2010-186257 | 8/2010 |

* cited by examiner

VEHICLE CONTROL APPARATUS

CROSS-REFERENCE TO RELATED APPLICATIONS

This application is a national phase application of International Application No. PCT/JP2011/051924, filed Jan. 31, 2011, the content of which is incorporated herein by reference.

TECHNICAL FIELD

The present invention relates to a vehicle control apparatus which performs a remote operation of a vehicle by using a wireless terminal.

BACKGROUND ART

Patent Literature 1 discloses a vehicle control apparatus which makes a vehicle enter or leave a narrow parking lot through a vehicle remote operation using a remote control. In this vehicle control apparatus, a vehicle can be steered, driven, braked, and the like in a remote operation manner by using a remote control, and thereby the vehicle can be made to enter a parking lot, or the vehicle in the parking lot can be made to leave the parking lot by a driver operating the remote control.

CITATION LIST

Patent Literature

[Patent Literature 1] Japanese Unexamined Patent Application Publication No. 2008-033438

SUMMARY OF INVENTION

Technical Problem

However, since a remote control can be operated by anyone, in the vehicle control apparatus disclosed in Patent Literature 1, there is a possibility that a person other than the driver may remotely operate the vehicle using the remote control and thereby a vehicle remote operation which is not intended by the driver may be performed.

Therefore, an object of the present invention is to provide a vehicle control apparatus capable of preventing a remote operation of a vehicle which is not intended by a driver.

Solution to Problem

A vehicle control apparatus related to the present invention, controls a vehicle through direct operations of the vehicle performed from inside of the vehicle and remote operations of the vehicle performed from a wireless terminal, and prioritizes the direct operations from inside of the vehicle when at least some of the direct operations from inside of the vehicle and at least some of the remote operations from the wireless terminal come into conflict.

According to this vehicle control apparatus, direct operations from inside of the vehicle are basically performed by a driver, whereas remote operations from the wireless terminal can be performed by persons other than the driver. Therefore, in a case where these operations come into conflict, the direct operations from inside of the vehicle are prioritized, and thereby it is possible to prevent a remote operation of the vehicle which is not intended by the driver.

In this case, when stopping and deceleration operations from inside of the vehicle and driving operations from the wireless terminal come into conflict, the stopping and deceleration operations from inside of the vehicle are preferably prioritized. As above, even if the driving operations come into conflict with the stopping and deceleration operations, the stopping and deceleration operations from inside of the vehicle are prioritized, and thereby it is possible to prevent a remote operation of the vehicle which is not intended by the driver.

In addition, when the same type of operation comes into conflict between the direct operations from inside of the vehicle and the remote operations from the wireless terminal, the direct operations from inside of the vehicle are preferably prioritized. As above, when the same type of operation comes into conflict, the direct operations from inside of the vehicle are prioritized, and thereby it is possible to prevent a remote operation of the vehicle which is not intended by the driver.

A vehicle control apparatus related to the present invention controls a vehicle through direct operations of the vehicle performed from inside of the vehicle and remote operations of the vehicle performed from a wireless terminal, and cancels at least some of the remote operations from the wireless terminal while a driver's seat is being taken.

While the driver's seat is being taken, it is considered that the driver performs direct operations. For this reason, at least some of the remote operations from, the wireless terminal are canceled while the driver's seat is being taken, and thereby it is possible to prevent a remote operation of the vehicle which is not intended by the driver.

Advantageous Effects of Invention

According to the present invention, it is possible to prevent a remote operation of a vehicle which is not intended by a driver,

DESCRIPTION OF EMBODIMENTS

Hereinafter, with reference to the drawings, preferred embodiments of a vehicle control apparatus related to the present invention will be described in detail. The present embodiment is to apply a vehicle control apparatus related to the present invention to a vehicle control apparatus which has a function of making a vehicle enter a parking lot through a remote operation using a remote control. In addition, the same or corresponding part is given the same reference numeral throughout the overall drawings.

First Embodiment

Figure 1:
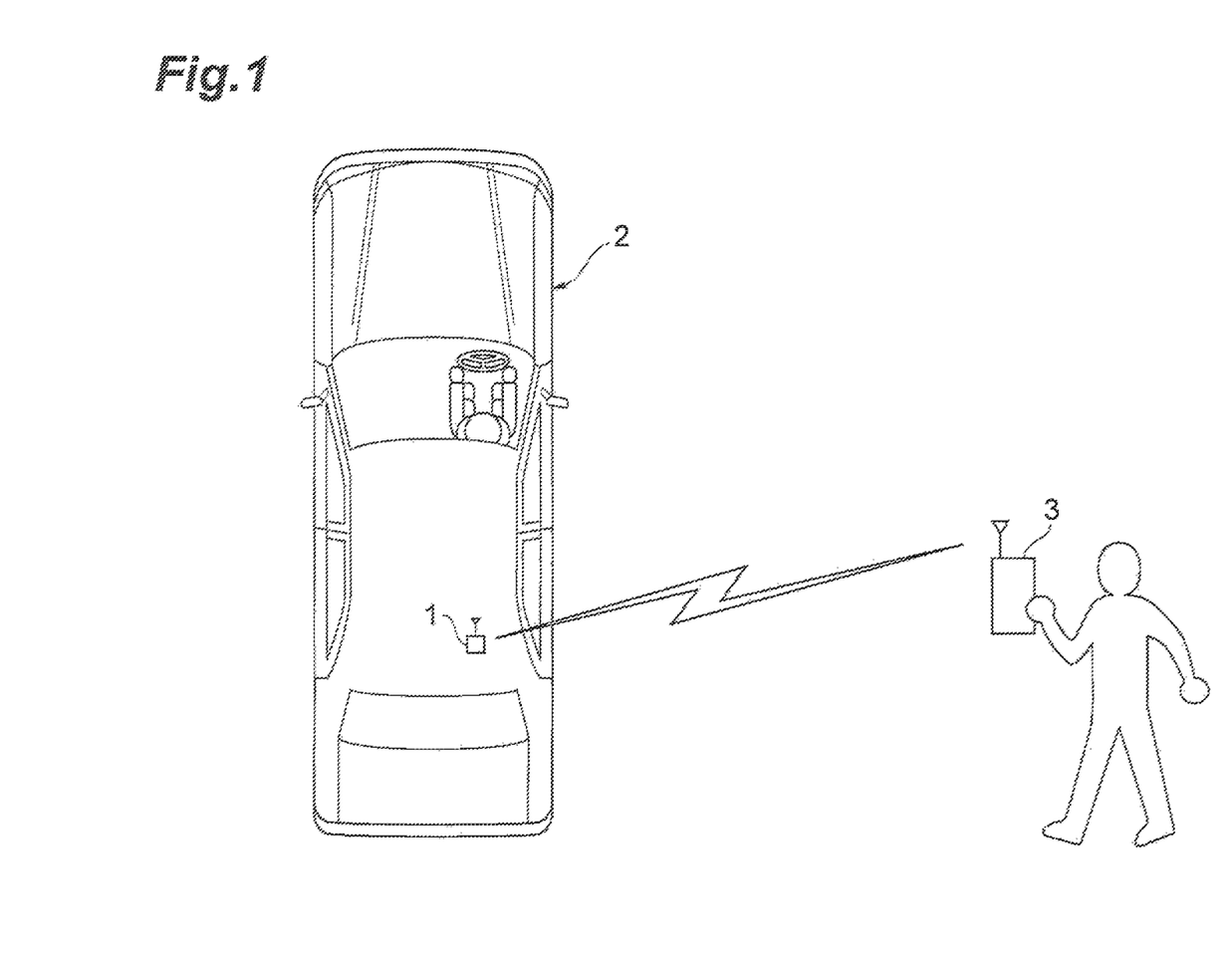
FIG. 1 is a schematic diagram of a vehicle control apparatus according to an embodiment.

FIG. 1 is a schematic diagram illustrating a vehicle control apparatus related to an embodiment. As shown in FIG. 1, a vehicle control apparatus 1 of the present embodiment is mounted in a vehicle 2, performs a variety of control on the vehicle 2, and enables a remote operation from outside of the vehicle by using a remote control 3.

Figure 2:
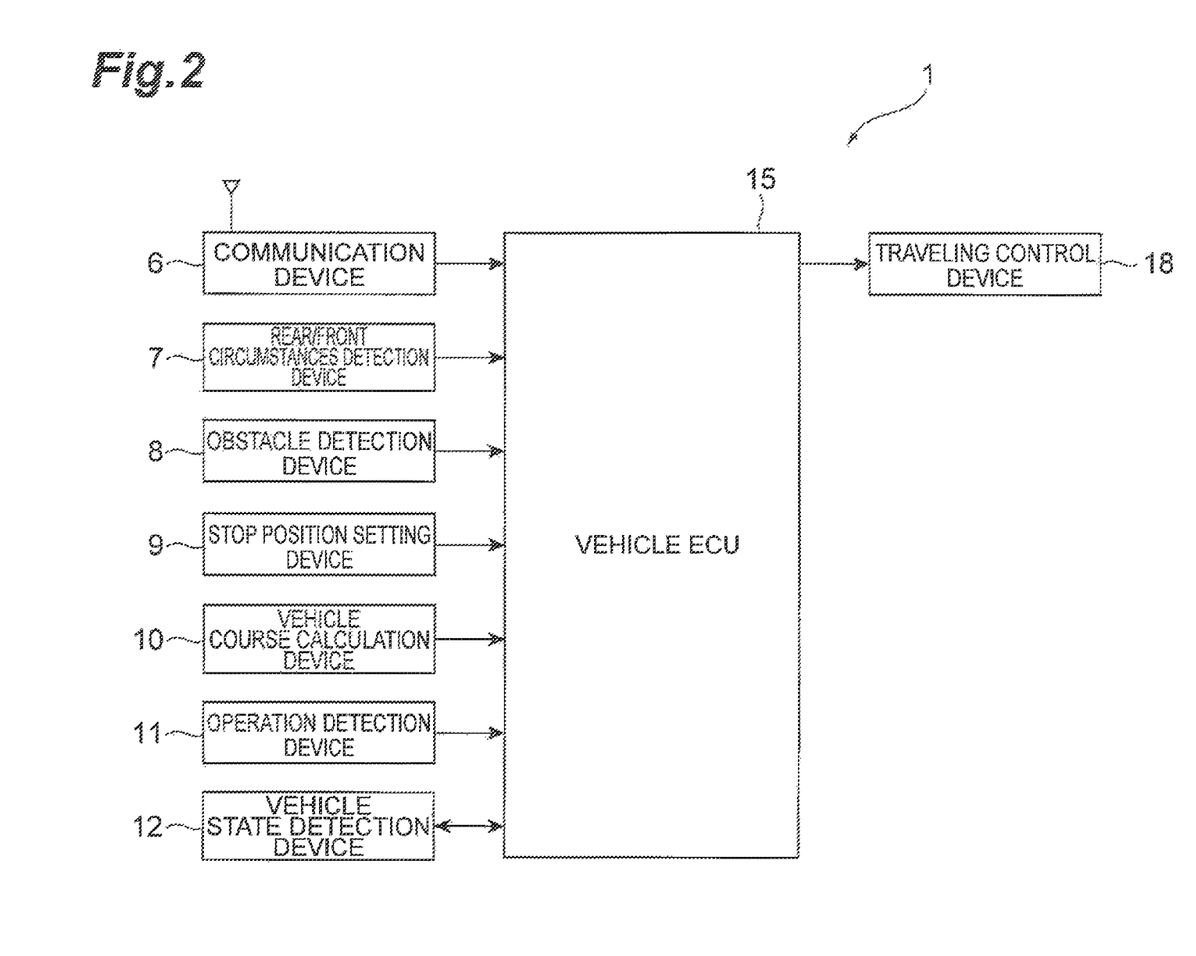
FIG. 2 is a schematic configuration diagram of the vehicle control apparatus.

FIG. 2 is a schematic configuration diagram of the vehicle control apparatus. As shown in FIG. 2, the vehicle control apparatus 1 includes a communication device 6, a rear/front circumstances detection device 7, an obstacle detection device 8, a stop position setting device 9, a vehicle course calculation device 10, an operation detection device 11, a vehicle state detection device 12, a vehicle ECU 15 (ECU: Electronic Control Unit), and a traveling control device 18.

The communication device 6 communicates with the remote control 3 by using communication means such as infrared communication. Specifically, the communication device 6 acquires driving operation information for performing a remote operation of the vehicle 2, position information indicating a current position of the remote control 3, or the like, from the remote control 3. In addition, the communication device 6 transmits the information acquired from the remote control 3 to the vehicle ECU 15.

The rear/front circumstances detection device 7 detects rear and front circumstances of the vehicle 2, and notifies a driver or the like of the detected circumstances. Specifically, the rear front circumstances detection device 7 images a rear side and a front side of the vehicle 2 by using imaging means (not shown) such as cameras mounted on the rear part and the front part of the vehicle 2. In addition, the rear/front circumstances detection device 7 displays the captured images on a display (not shown) mounted inside the vehicle.

The obstacle detection device 8 detects an obstacle present around the vehicle 2, and notifies a driver or the like of the detected obstacle. Specifically, the obstacle detection device 8 detects obstacles present around the vehicle 2, such as a curb stone, a wall, and a parked vehicle by using sensing means (not shown) such as a millimeter-wave radar or a laser radar, imaging means (not shown) such as a camera, a global positioning system (GPS) (not shown), and the like. Detected information includes the size, the kind and a position of an obstacle, and the like. The size, the kind and the position of an obstacle can be obtained using a well-known technique. For example, the size or the kind of an obstacle may be obtained through pattern matching of a captured image obtained by the imaging means, and a position of an obstacle may be obtained by the sensing means measuring a distance or by the GPS acquiring position information. In addition, the obstacle detection device 8 transmits information of the detected obstacle to the vehicle ECU 15. Further, the obstacle detection device 8 overlaps and displays a model of the detected obstacle on the rear and front captured images of the vehicle 2 which are displayed on the display.

The stop position setting device 9 sets a stop position (a position where entering of the vehicle into the parking lot is completed) where the vehicle 2 stops in order to perform a remote operation using the remote control 3. Specifically, the stop position setting device 9 sets a stop position of the vehicle 2 on a displayed screen of the display by the driver operating a pointing device such as a touch panel or an operation button. In addition, the stop position setting device 9 transmits the set stop position to the vehicle ECU 15.

The vehicle course calculation device 10 calculates a course along which the vehicle 2 travels through a remote operation using the remote control 3. Specifically, the vehicle course calculation device 10 calculates a course of the vehicle 2 from the current position of the vehicle 2 acquired from the GPS or the like to the stop position set by the stop position setting device 9. In this calculation of a course, the vehicle course calculation device 10 makes it a condition that the vehicle does not collide with the obstacle detected by the obstacle detection device 8. Further, the vehicle course calculation device 10 calculates a traveling plan in which forward movement, backward movement, acceleration, deceleration, constant speed traveling, steering, and the like are combined, such that the vehicle 2 travels along the calculated course. In addition, the vehicle course calculation device 10 transmits the calculated course and traveling plan of the vehicle 2 to the vehicle ECU 15.

The operation detection device 11 detects various operations from inside of the vehicle. Specifically, the operation detection device 11 detects driving operations which are performed inside the vehicle by the driver, such as an acceleration operation (a start operation, an acceleration operation, or the like), a braking operation (a deceleration operation, a stopping operation, or the like), a steering operation, and a shift operation. In addition, the operation detection device 11 transmits information of the detected driving operation to the vehicle ECU 15. For this reason, the vehicle ECU 15 acquires the driving operation information transmitted from the operation detection device 11 and thereby can recognize whether or not there is a driving operation from inside of the vehicle by the driver, and content of the driving operation performed from inside of the vehicle by the driver.

The vehicle state detection device 12 detects various states of the vehicle 2. Specifically, the vehicle state detection device 12 includes an opening and closing sensor detecting opening and closing of doors of the vehicle 2, a seating sensor detecting whether or not a driver's seat is being taken, and the like. In addition, the vehicle state detection device 12 transmits the vehicle state information detected by the sensor to the vehicle ECU 15. In other words, when the opening and closing sensor which is one of the vehicle state detection device 12 detects a closed state or an open state of the door, the detected information is transmitted to the vehicle ECU 15. Further, when the seating sensor which is one of the vehicle state detection device 12 detects that the driver takes the driver's seat, the detected information is transmitted to the vehicle ECU 15.

The vehicle ECU 15 is a control unit which performs traveling control of the vehicle 2 on the basis of a driving operation (direct operation) from inside of the vehicle by the driver and a driving operation (remote operation) from the remote control 3. Specifically, the vehicle ECU 15 performs traveling control of the vehicle 2 through a remote operation using the remote control 3 on the basis of the information which is acquired by the communication device 6 and is transmitted from the remote control 3, the obstacle information detected by the obstacle detection device 8, the stop position information set by the stop position setting device 9, the course and traveling plan of the vehicle 2 calculated by the vehicle course calculation device 10, the driving operation information detected by the operation detection device 11, and the vehicle state information detected by the vehicle state detection device 12. In addition, detailed content processed by the vehicle ECU 15 will be described later.

The traveling control device 18 performs specific traveling control of the vehicle 2 on the basis of the traveling control by the vehicle ECU 15. Specifically, the traveling control device 18 includes a driving force control unit which controls the magnitude of a driving force, a braking force control unit which, controls the magnitude of a braking force, a steering control unit which controls a steering angle, and the like.

Figure 3:
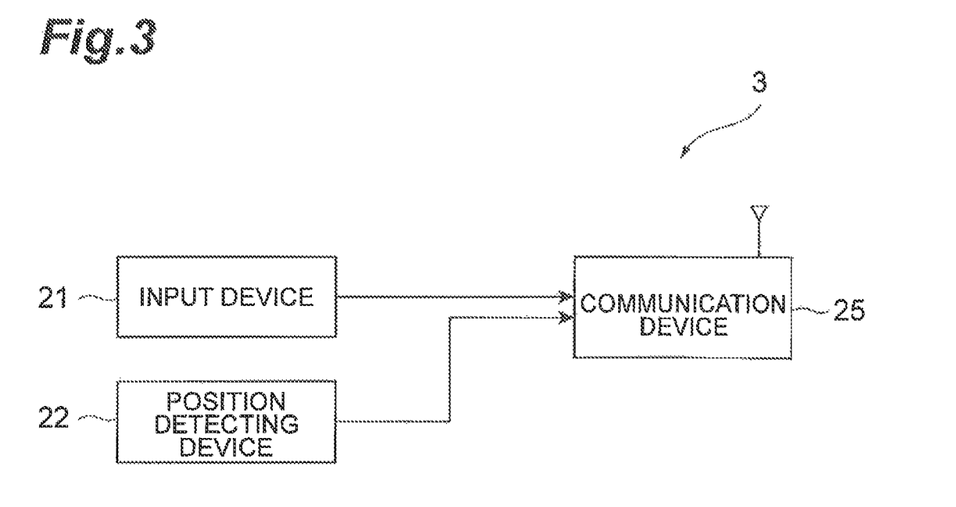
FIG. 3 is a schematic configuration diagram of a remote control which performs a vehicle remote operation.

FIG. 3 is a schematic configuration diagram of the remote control which performs a remote operation of the vehicle. As shown in FIG. 3, the remote control 3 includes an input device 21, a position detecting device 22, and a communication device 25.

The input device 21 allows an operator of the remote control 3 to perform a remote operation of the vehicle 2. Specifically, the input device 21 is constituted by a remote operation button such as a keypad displayed on a touch panel type display or a push button. The input device 21 is correlated with a driving operation function for driving the vehicle 2 through a remote operation. In other words, the input device 21 has a driving operation function of moving the vehicle 2 according to a course and a traveling plan calculated by the vehicle course calculation device 10 of the vehicle control apparatus 1, and respective driving operation functions of performing forward movement, backward movement, acceleration, deceleration, constant speed traveling, emergency stopping, and steering of the vehicle 2. In addition, when the remote operation button is operated by the operator, the input device 21 transmits the operation information to the communication device 25.

The position detecting device 22 detects a position of the remote control 3. Specifically, the position detecting device 22 detects a position of the remote control 3 by acquiring position information from GPS, by acquiring a relative position with the vehicle 2 through communication with the vehicle control apparatus 1, or the like. In addition, the position detecting device 22 transmits the acquired position information of the remote control 3 to the communication device 25. Thereby, the operator can perform a driving operation of the vehicle 2 from the remote control 3 by operating the input device 21.

The communication device 25 communicates with the remote control 3 by using communication means such as infrared communication. Specifically, the communication device 25 transmits operation information which is operated in the input device 21 to the communication device 6 of the vehicle control apparatus 1 and also transmits position information of the remote control 3 detected by the position detecting device 22 to the communication device 6 of the vehicle control apparatus 1.

Figure 4:
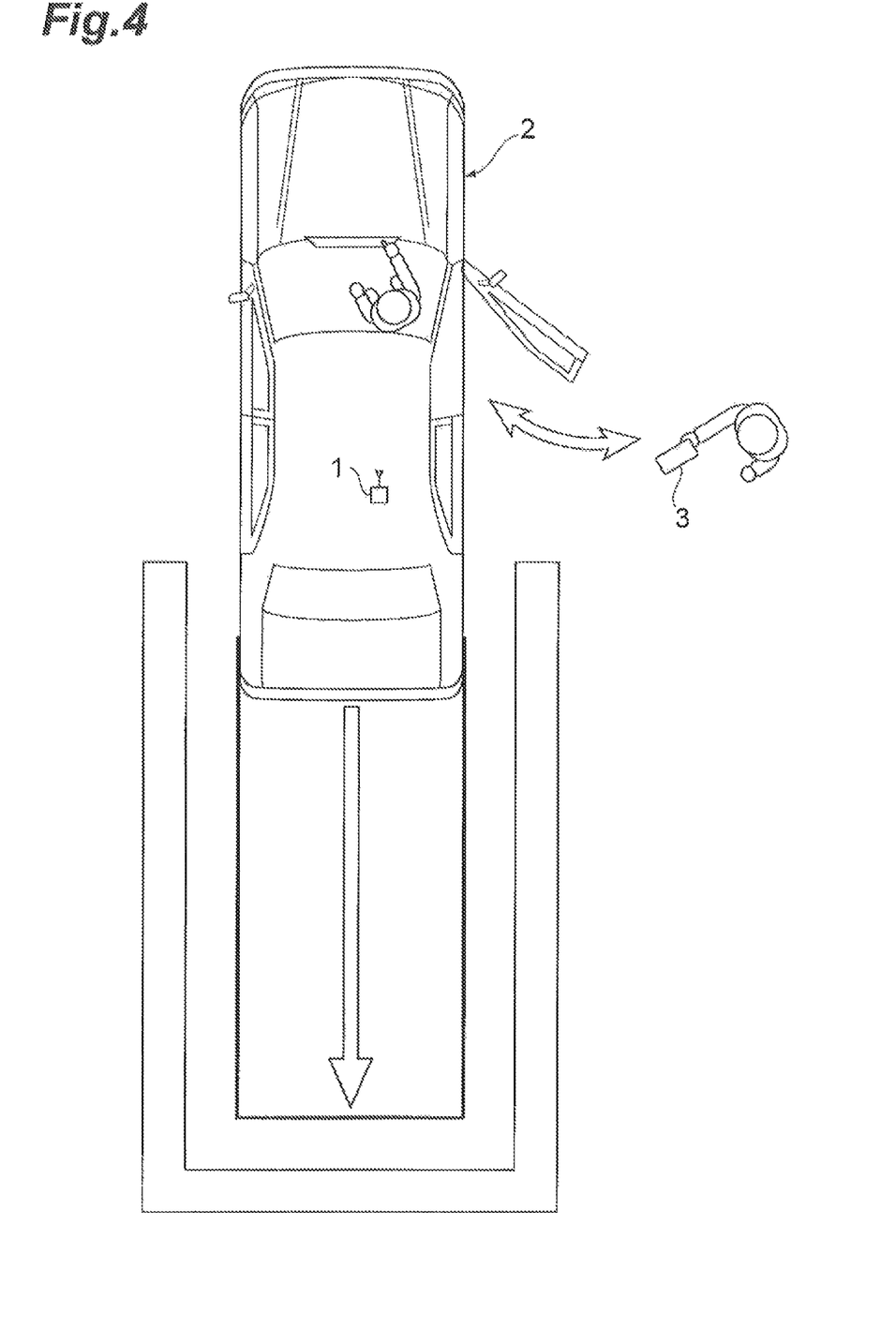
FIG. 4 is a diagram illustrating a state in which a vehicle is made to enter a parking lot through a remote operation using the remote control.
Figure 5:
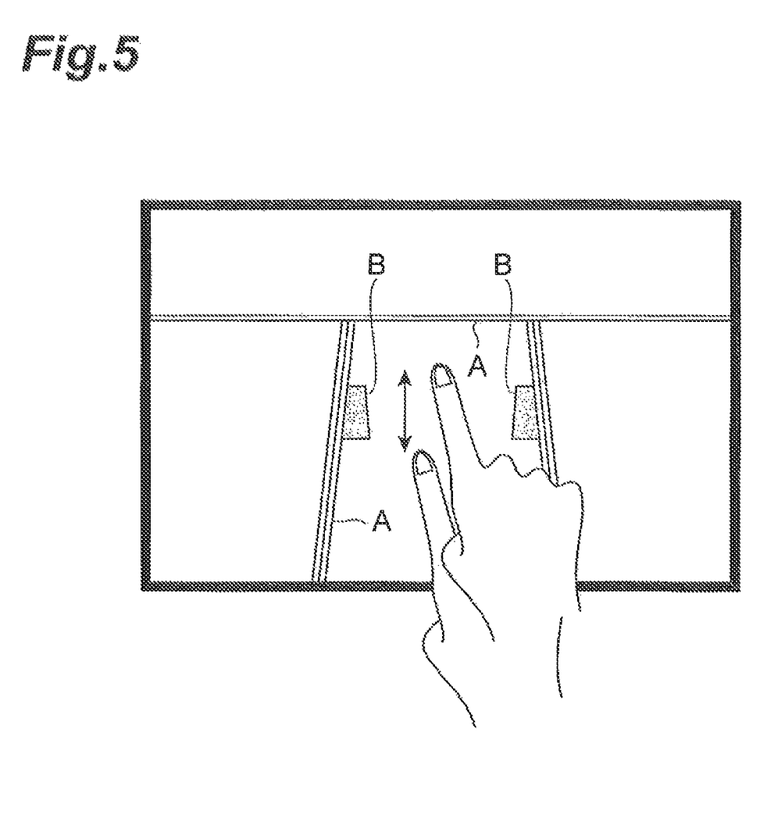
FIG. 5 is a diagram illustrating a display example of a display installed inside the vehicle.
Figure 6:
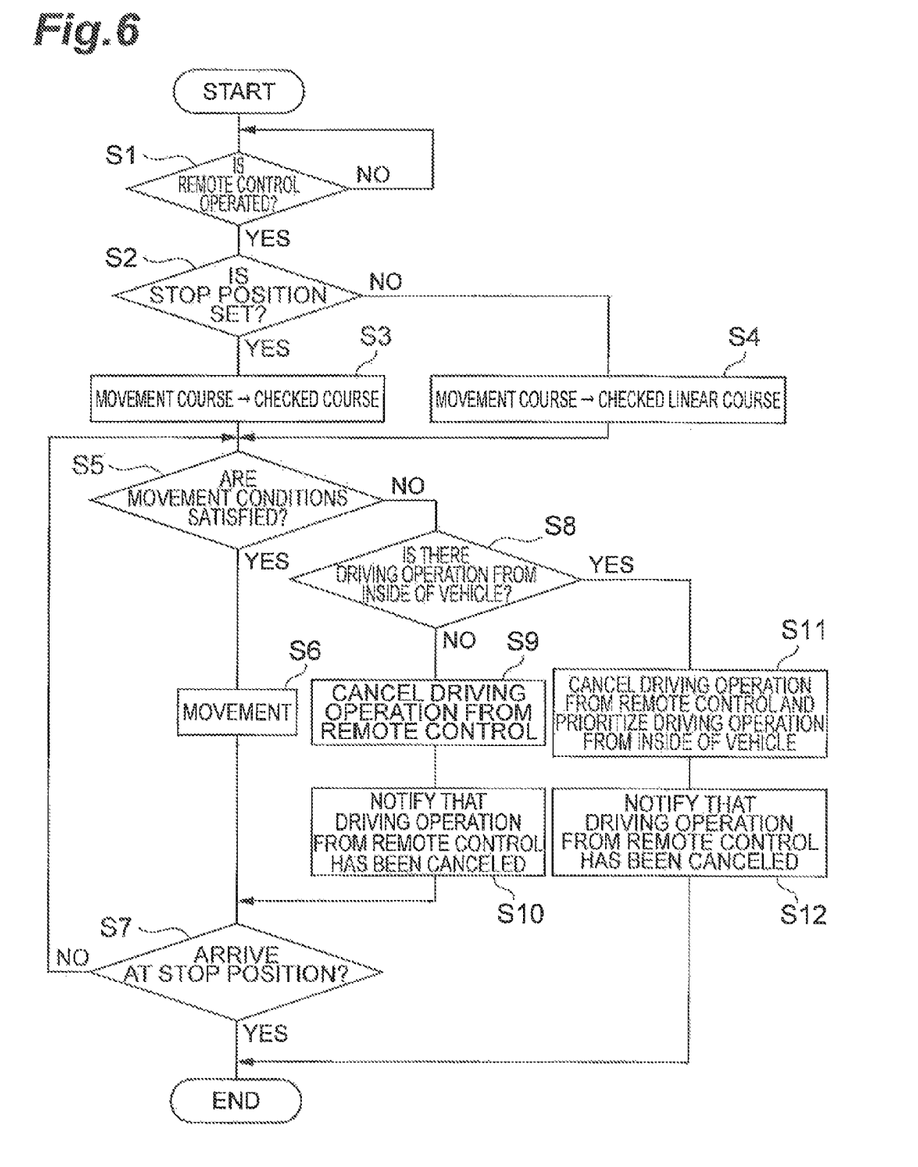
FIG. 6 is a flowchart illustrating a process operation of the vehicle control apparatus in a first embodiment.

Next, a description will be made of a process operation of a case of performing a driving operation of the vehicle 2 through a remote operation using the remote control 3 with reference to FIGS. 4 to 6. FIG. 4 is a diagram illustrating a state in which a vehicle is made to enter a parking lot through a remote operation using the remote control. FIG. 5 is a diagram illustrating a display example of a display installed inside the vehicle. FIG. 6 is a flowchart illustrating a process operation of the vehicle control apparatus.

Here, as shown in FIG. 4, a case is considered in which the vehicle 2 is moved backward and enters a parking lot which is narrow to an extent in which doors of the vehicle cannot be opened. In this case, after a driver drives the vehicle 2 so as to be located in the parking lot, the driver cannot come out of the vehicle 2. Therefore, as described below in detail, the vehicle 2 is made to enter the parking lot through a remote operation using the remote control 3.

First, the vehicle 2 is stopped in front of a parking lot which the vehicle is desired to enter. Then, as shown in FIG. 5, on the display installed inside the vehicle, models of obstacles which are present around the vehicle 2 and are detected by the obstacle detection device 8 are displayed so as to overlap a captured image of the rear side of the vehicle 2, obtained by the rear/front circumstances detection device 7. In addition, in FIG. 5, the reference sign A indicates a wall surrounding the parking lot, and the reference sign B indicates models of obstacles detected by the obstacle detection device 8.

Next, the vehicle ECU 15 determines whether or not the vehicle is remotely operated using the remote control 3 (step S1). This determination is performed based on whether or not the driver selects a remote operation using the remote control 3 through the display, the operation button, or the like installed in the vehicle 2.

If it is determined that the vehicle is remotely operated using the remote control 3 in step S1, the vehicle ECU 15 determines whether or not a stop position of the vehicle 2 is set (step S2).

Here, the determination of whether or not a stop position of the vehicle 2 is set will be described in detail. In a case where the vehicle 2 is moved backward along a simple linear course, a stop position of the vehicle 2 can be obtained when a course of the vehicle 2 is calculated by the vehicle course calculation device 10. For this reason, in this case, a stop position of the vehicle 2 is not particularly and necessarily set in step S2. On the other hand, in a case where the vehicle 2 cannot be moved backward along a simple linear course, a course of the vehicle 2 cannot be calculated by the vehicle course calculation device 10 unless a stop position of the vehicle 2 is set. For this reason, in this case, a stop position of the vehicle 2 is required to be set in S2. Therefore, in step S2, whether or not a stop position of the vehicle 2 is set is determined based on whether or not the vehicle 2 can be moved backward along a simple linear course. In addition, this determination may be performed based on an operation by the driver or may be performed based on calculation by the vehicle ECU 15.

In addition, if it is determined that a stop position of the vehicle 2 is set in step S2 (step S2: YES), the vehicle ECU 15 sets a stop position of the vehicle 2 using the stop position setting device 9, and calculates a course and a traveling plan of the vehicle 2 using the vehicle course calculation device 10 (step S3). The setting of a stop position may be performed, for example, as shown in FIG. 5, by displaying a captured image of the rear side of the vehicle 2 on the touch panel type display and the driver touching a stop position with the finger. In addition, the vehicle ECU 15 displays the course calculated in step S3 on the display, and when the driver checks the course displayed on the display, the vehicle ECU 15 decides the checked course as a course along which the vehicle 2 is moved through a remote operation using the remote control 3.

On the other hand, if it is determined that a stop position of the vehicle 2 is not set in step S2 (step S2: NO), the vehicle ECU 15 omits setting of a stop position by the driver and calculates a course and a traveling plan of the vehicle 2 (step S4). In addition, a course of the vehicle 2 is set to a simple linear shape in step S4. Further, the vehicle ECU 15 displays the linear course calculated in step S4 on the display, and when the driver checks the linear course displayed on the display, the vehicle ECU 15 decides the checked linear course as a course along which the vehicle 2 is moved through a remote operation using the remote control 3.

Next, the vehicle ECU 15 determines whether or not move conditions of the remote operation are satisfied (step S5).

Here, the movement conditions of the remote operation will be described in detail. The movement conditions of the remote operation are conditions for determining whether or not a remote operation of the vehicle 2 using the remote control 3 is allowable, and may include, for example, the following eleven items.

Movement condition 1: A stop position being set. Specifically, if it is determined that a stop position of the vehicle 2 is set in step S2 (step S2: YES), the movement condition is that this stop position is correctly set, in addition, if it is determined that a stop position of the vehicle 2 is not set in step S2 (step S2: NO), the movement condition 1 is excluded.

Movement condition 2: A course along which the vehicle 2 is moved through a remote operation using the remote control 3 being checked by a driver. Specifically, the movement condition is that the course calculated in step S3 or step S4 is checked by the driver. In addition, the checking performed by the driver may be determined, for example, by displaying a keypad for checking on the touch panel type display and based on whether or not this keypad is touched.

Movement condition 3: The remote control 3 being operated from outside of the vehicle. Specifically, the movement condition is that a position of the remote control 3 which is specified by position information transmitted from the remote control 3 is outside of the vehicle. In addition, transmission of position information from the mote control 3 to the vehicle control apparatus 1 may be performed in the event of the vehicle control apparatus 1 requesting the remote control 3 to transmit position information, or may be performed periodically by the remote control 3 regardless of a transmission request from the vehicle control apparatus 1.

Movement condition 4: No person taking a driver's seat. Specifically, the movement condition is that the seating sensor of the vehicle state detection device 12 does not detect that a person takes a driver's seat.

Movement condition 5: No driving operation being performed from inside of the vehicle. Specifically, the movement condition is that the operation detection device 11 detects no driving operation.

Movement condition 6: A door of the vehicle 2 not being open. Specifically, the movement condition is that the opening and closing sensor of the vehicle state detection device 12 detects a closed state of the door.

Movement condition 7: Electric waves of the remote control 3 arriving at the vehicle 2. Specifically, the movement condition is that communication between the communication device 25 of the remote control 3 and the communication device 6 of the vehicle control apparatus 1 is normally performed.

Movement condition 8: No obstacle such as a person being present in a course along which the vehicle 2 is moved through a remote operation using the remote control 3. Specifically, the movement condition is that the obstacle detection device 8 detects no obstacle in the course decided in step S3 or step S4.

Movement condition 9: Movement of the vehicle 2 being observed from an operator of the remote control 3. Specifically, the movement condition is that the obstacle detection device 8 detects no obstacle between a position of the remote control 3 specified by position information transmitted from the remote control 3 and the course decided in step S3 or step S4.

Movement condition 10: An operator of the remote control 3 being a person who maintains a driver's license. Specifically, the movement condition is that a fingerprint registration device is mounted in the remote control 3, a fingerprint of a person maintaining a driver's license is registered, and this registered fingerprint matches a detected fingerprint. In addition, this movement condition may be realized by mounting child lock in the remote control 3 and canceling the child lock.

Movement condition 11: In a case where a stop position is not set, an operator of the remote control 3 standing on the front side of a movement direction of the vehicle 2. Specifically, in a case where a stop position of the vehicle 2 is not set (step S2: NO, and step S4), since the operator of the remote control 3 moves and stops the vehicle 2 through a remote operation using the remote control 3, the operator of the remote control 3 is required to reliably check a movement of the vehicle 2. Therefore, in this case, the movement condition is that a position of the remote control 3 specified by position information transmitted from the remote control 3 is the front side of a movement direction of the vehicle 2.

In addition, if it is determined that the movement conditions are satisfied in step S5 (step S5: YES), the vehicle ECU 15 moves the vehicle 2 according to the course and traveling plan decided in step S3 or step S4 while the remote operation button of the remote control 3 is pushed (step S6). At this time, when the remote operation button of the remote control 3 is released, the vehicle ECU 15 decelerates and stops the vehicle 2.

Next, the vehicle ECU 15 determines whether or not the vehicle 2 arrives at the stop position (step S7). Specifically, it is determined that the vehicle 2 arrives at the stop position when the vehicle 2 which is moved through, a remote operation using the remote control 3 arrives at the stop position set in step S3. On the other hand, it is determined that the vehicle 2 does not arrive at the stop position when the vehicle 2 which is moved through a remote operation using the remote control 3 does not arrive at the stop position set in step S3.

In addition, if it is determined that the vehicle 2 does not arrive at the stop position in step S7 (step S7: NO), the vehicle ECU 15 returns to step S5 and repeatedly performs the above-described processes again. On the other hand, if it is determined that the vehicle 2 arrives at the stop position in step S7 (step S7: YES), the vehicle ECU 15 finishes the process.

If it is determined that the movement conditions are not satisfied in the above-described step S5 (step S5: NO), the vehicle ECU 15 determines whether or not a driving operation from inside of the vehicle is performed (step S8). Specifically, in step S8, the determination is performed based on whether or not the movement condition 5 among the respective movement conditions in step S5 is satisfied. In addition, determination targets in step S8 are not necessarily all driving operations but may be some driving operations. For example, only a braking operation which is a deceleration operation or a stopping operation may be a determination target.

In addition, if it is determined that a driving operation from inside of the vehicle is not performed in step S8 (step S8: NO), the vehicle ECU 15 cancels a driving operation from the remote control 3 (step S9). Further, since the movement condition 4 is that a person does not take a driver's seat in step S5, a driving operation from the remote control 3 is canceled in step S9, while the driver's seat is not being taken. Furthermore, a notification that a driving operation from the remote control 3 has been canceled is sent (step S10). In addition, the notification in step S10 may be performed, for example, using a sound announcement from a speaker mounted inside the vehicle, or a video announcement from the display mounted inside the vehicle.

In addition, the vehicle ECU 15 returns to step S5 and repeatedly performs the above-described processes until the vehicle 2 arrives at the stop position (step S7), and finishes the process when the vehicle 2 arrives at the stop position.

On the other hand, if it is determined that a driving operation from inside of the vehicle is performed in step S8 (step S8: YES), the vehicle ECU 15 cancels the driving operation from the remote control 3 and preferentially executes the driving operation from inside of the vehicle (step S11). Thereby, in a case where a driving operation from inside of the vehicle and a driving operation from the remote control 3 come into conflict, the driving operation from inside of the vehicle is prioritized. In addition, a notification that traveling control from the remote control 3 has been canceled is sent (step S12). Further, the notification in step S12 may be performed in the same manner as the notification in step S10.

In addition, the vehicle ECU 15 finishes the process without performing a driving operation using the remote control 3.

As above, according to the first embodiment, in a case Where a driving operation from inside of the vehicle and a driving operation from the remote control 3 come into conflict, the driving operation from inside of the vehicle is prioritized, and thereby it is possible to prevent a remote operation of the vehicle 2 which is not intended by a driver.

In addition, even if conflict operations from inside of the vehicle and the remote control 3 are performed, the operation from inside of the vehicle is prioritized through the processes in step S8 and step S11, and thus it is possible to prevent a remote operation of the vehicle 2 which is not intended by a driver.

Further, a driving operation from the remote control 3 is canceled while the driver's seat is being taken, and thus it is possible to prevent a remote operation of the vehicle which is not intended by a driver.

Second Embodiment

Next, the second embodiment will be described. The second embodiment is basically the same as the first embodiment, and only some of the process operations by the vehicle ECU 15 are different. For this reason, hereinafter, only a part different from the first embodiment will be described, and description of the same part as the first embodiment will be omitted.

Figure 7:
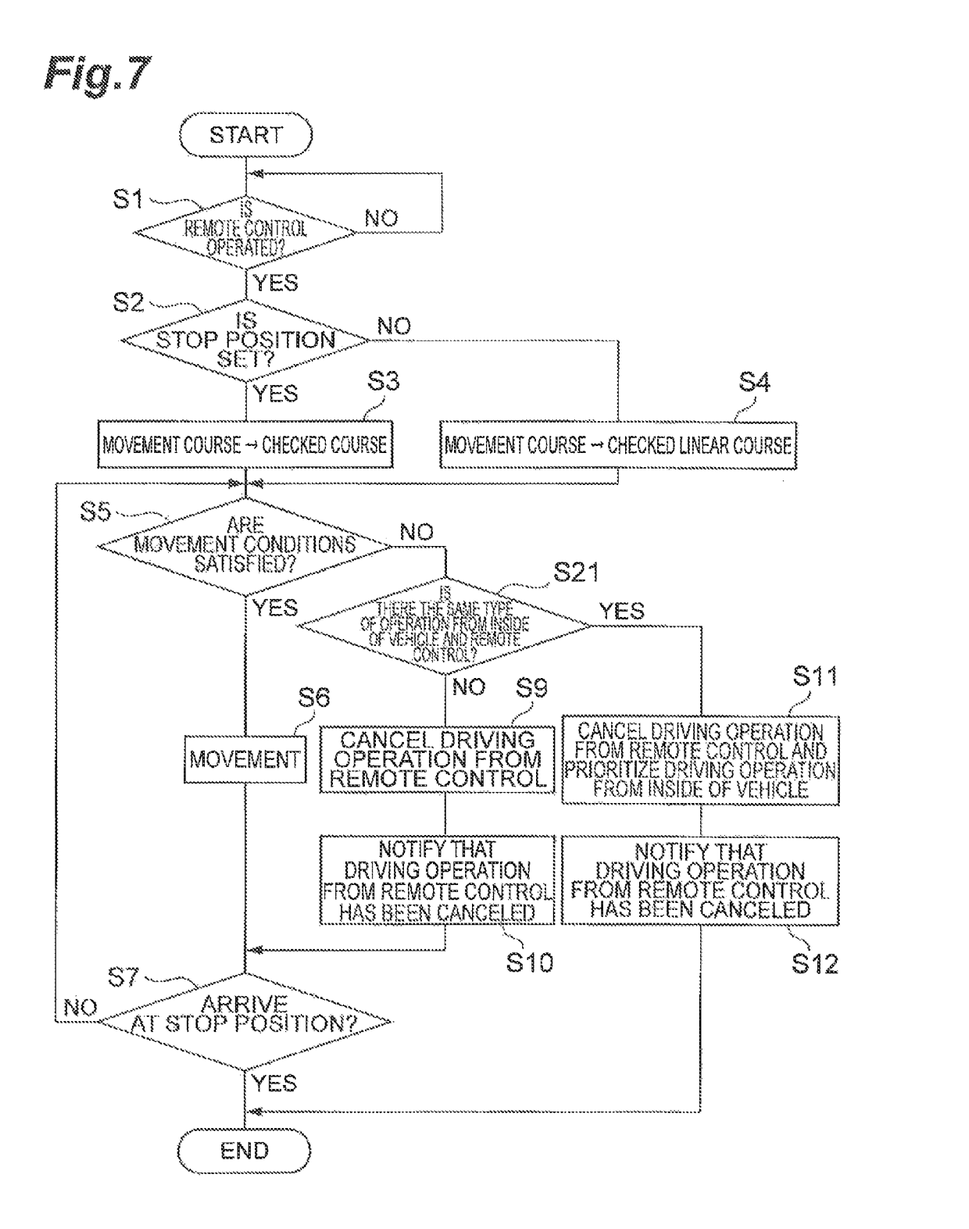
FIG. 7 is a flowchart illustrating a process operation of the vehicle control apparatus in a second embodiment.

FIG. 7 is a flowchart illustrating a process operation performed by the vehicle control apparatus in the second embodiment. As shown in FIG. 7, the vehicle ECU 15 sequentially performs step S1 to step S7 in the same manner as in the first embodiment.

In addition, if it is determined that the movement conditions are not satisfied in step S5 (step S5: NO), the vehicle ECU 15 determines whether or not the same type of operation is performed at inside of the vehicle and the remote control 3 (step S21). Specifically, in step S21, the type of driving operation from inside of the vehicle, detected by the operation detection device 11 is compared with the type of driving operation from the remote control 3, acquired via the communication device 6, and if the types are the same, it is determined that the same type of operation is performed at inside of the vehicle and the remote control 3, and if the types are different, it is determined that the same type of operation is not performed at inside of the vehicle and the remote control 3.

In addition, if it is determined that the same type of operation is not performed at inside of the vehicle and the remote control 3 in step S21 (step S21: NO), the vehicle ECU 15 proceeds to step S9, and performs the same processes as in the first embodiment therefrom.

In addition, if it is determined that the same type of operation is performed at inside of the vehicle and the remote control 3 in step S21 (step S21 YES), the vehicle ECU 15 proceeds to step S11, and performs the same processes as in the first embodiment therefrom.

As above, according to the second embodiment, even if the same type of operation is performed at inside of the vehicle and the remote control 3, a driving operation from inside of the vehicle is prioritized through the processes in step S21 and step S11, and thus it is possible to prevent a remote operation of the vehicle 2 which is not intended by a driver.

As above, although preferred embodiments of the present invention have been described, the present invention is not limited to the above-described embodiments. For example, although, in the above-described embodiments, a description has been made of a case where, if driving operations from inside of the vehicle and driving operations from the remote control 3 come into conflict, all the driving operations from the remote control 3 are canceled and the driving operations from inside of the vehicle are prioritized, driving operations from the remote control 3 may be canceled and driving operations from inside of the vehicle may be prioritized only in a case where some driving operations come into conflict.

In addition, although, in the above-described embodiments, a description has been made of a case where, if driving operations from inside of the vehicle and driving operations from the remote control. 3 come into conflict, the driving operations from inside of the vehicle are prioritized, the driving operations from the remote control 3 may be prioritized in a case where driving operations other than stopping and deceleration operations are performed from inside of the vehicle, and driving operations of the stopping and deceleration operations are performed from the remote control 3.

INDUSTRIAL APPLICABILITY

The present invention is applicable to a vehicle control apparatus which performs traveling control of a vehicle through a remote operation.

REFERENCE SIGNS LIST

1 Vehicle Control Apparatus, 2 Vehicle, 3 Remote Control (Wireless Terminal), 6 Communication Device, 7 Rear/Front Circumstances Detection Device, 8 Obstacle Detection Device, 9 Stop Position Setting Device, 10 Vehicle Course Calculation Device, 11 Operation Detection Device, 12 Vehicle State Detection Device, 15 Vehicle ECU 18 Traveling Control Device, 21 Input Device, 22 Position Detecting Device, 25 Communication Device

The invention claimed is:

1. A vehicle control apparatus which performs vehicle control of a vehicle through direct operations of the vehicle performed from inside of the vehicle and remote operations of the vehicle performed from a wireless terminal, the vehicle control apparatus comprising:
   a stop position setting device which sets a stop position of the vehicle by operation from inside of the vehicle;
   a vehicle course calculation device which calculates a course of the vehicle from a current position of the vehicle to the stop position, and calculates a traveling plan such that the vehicle travels along the course; and
   a control unit which performs traveling control of the vehicle through a remote operation from a wireless terminal on the basis of the course and the traveling plan when the stop position of the vehicle is set by the stop position setting device and the course and the traveling plan are calculated by the vehicle course calculation device,
   wherein, even if the stop position of the vehicle is set by the stop position setting device and the course and the traveling plan are calculated by the vehicle course calculation device, the control unit prioritizes driving operations from inside of the vehicle by canceling remote operations from the wireless terminal if movement conditions for moving the vehicle through the remote operations from the wireless terminal are not satisfied and the driving operations from inside of the vehicle are not performed.

2. The vehicle control apparatus according to claim 1, wherein the movement conditions include a driver's seat being in a taken state.

3. The vehicle control apparatus according to claim 1, wherein the control unit prioritizes the driving operations from the wireless terminal if driving operations other than stopping and deceleration operations are performed from inside of the vehicle and driving operations of stopping and deceleration operations are performed from the wireless terminal.

* * * * *